United States Patent [19]

Vahratian et al.

[11] 4,368,649

[45] Jan. 18, 1983

[54] AUTOMATIC TRANSAXLE DRIVELINE HAVING FOUR FORWARD DRIVING RATIOS AND A SINGLE REVERSE RATIO

[75] Inventors: Adam Vahratian; Howard L. Croswhite, both of Livonia; Roosevelt Maynard, Jr., Birmingham; Po Lung Liang, Livonia, all of Mich.

[73] Assignee: Ford Motor Company, Dearborn, Mich.

[21] Appl. No.: 164,869

[22] Filed: Jul. 1, 1980

[51] Int. Cl.³ .............................................. F16H 37/08
[52] U.S. Cl. ...................................... 74/695; 74/701; 74/730; 74/758
[58] Field of Search ............... 74/730, 758, 759, 694, 74/695, 705, 713, 665 G, 665 GA, 665 GB, 665 GC, 665 GE, 701, 774

[56] References Cited

U.S. PATENT DOCUMENTS

| | | |
|---|---|---|
| 3,158,040 | 11/1964 | Moore . |
| 3,339,431 | 9/1967 | Croswhite et al. .................. 74/688 |
| 3,446,095 | 5/1969 | Bookout ............................. 74/730 |
| 3,473,415 | 10/1969 | Kepner ............................... 74/759 |
| 3,482,469 | 12/1969 | Mori ................................... 74/763 |
| 3,483,771 | 12/1969 | Forster et al. ...................... 74/759 |
| 3,491,621 | 1/1970 | Moan .................................. 74/759 |
| 3,602,055 | 8/1971 | Hause et al. ....................... 74/759 |
| 3,640,153 | 2/1972 | Kepner ............................... 74/759 |
| 3,678,784 | 7/1972 | Lemieux ............................ 74/759 |
| 3,705,521 | 12/1972 | Smith ................................. 74/759 |
| 3,797,332 | 3/1974 | Cameron et al. ................... 74/763 |
| 3,799,004 | 3/1974 | Hause ................................. 74/763 |
| 3,824,876 | 7/1974 | Mori et al. ......................... 74/759 |
| 4,007,648 | 2/1977 | Bookout ............................. 74/763 |
| 4,014,223 | 3/1977 | Pierce, Jr. .......................... 74/688 |
| 4,056,988 | 11/1977 | Kubo et al. ........................ 74/695 |
| 4,086,827 | 5/1978 | Chana ................................. 74/759 |
| 4,143,561 | 3/1979 | Melhorn ............................. 74/730 |
| 4,280,374 | 7/1981 | Kubo et al. ........................ 74/730 |

Primary Examiner—Rodney H. Ronck
Attorney, Agent, or Firm—Donald J. Harrington; Keith L. Zerschling

[57] ABSTRACT

A planetary transaxle driveline having a pair of simple planetary gear units adapted to deliver torque to aligned, oppositely disposed vehicle wheel driveshafts comprising a hydrokinetic unit adapted to be mounted for rotation on a first axis, the planetary gearing being adapted to be mounted on a second axis spaced laterally from and parallel to the first axis, a drive sprocket and chain mechanism for connecting driven portions of the hydrokinetic unit to input portions of the gearing, and clutch-and-brake structure for effecting ratio changes in the gearing whereby the gearing is adapted for nonsynchronous ratio changes from the second forward driving ratio to the third forward driving ratio and a nonsynchronous shift from the third driving ratio to the fourth driving ratio, all of the ratio changes being achieved by clutch-and-brake structure with a minimum number of friction elements and with a minimum space requirement.

2 Claims, 6 Drawing Figures

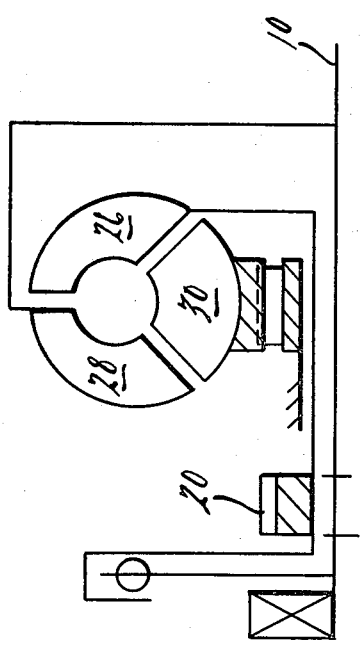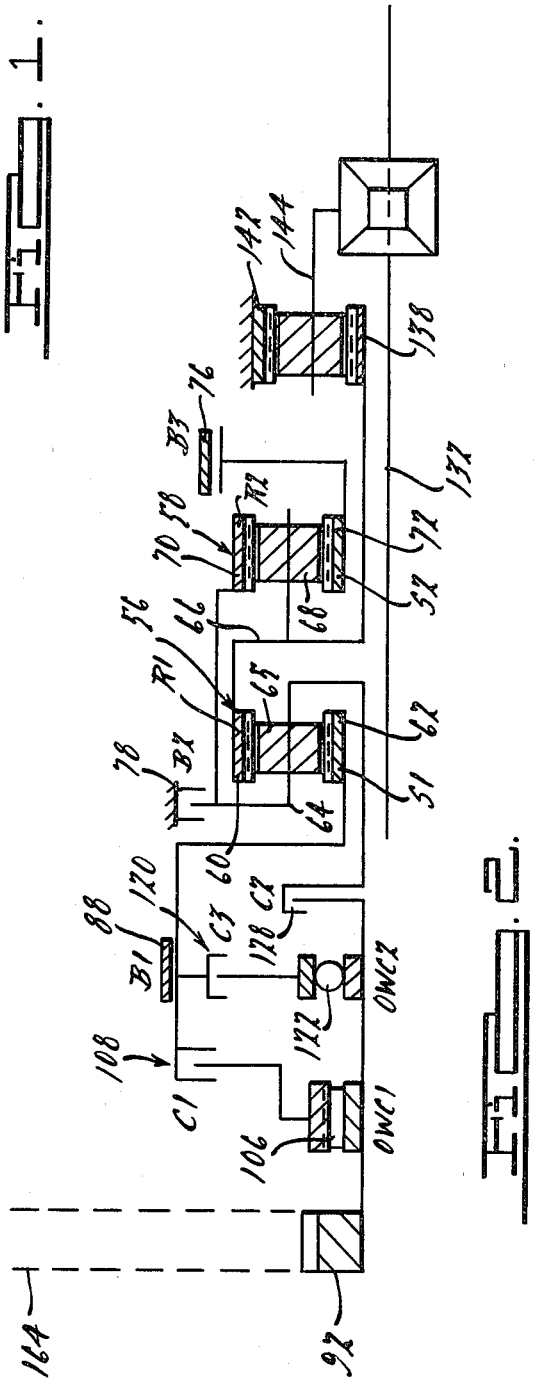

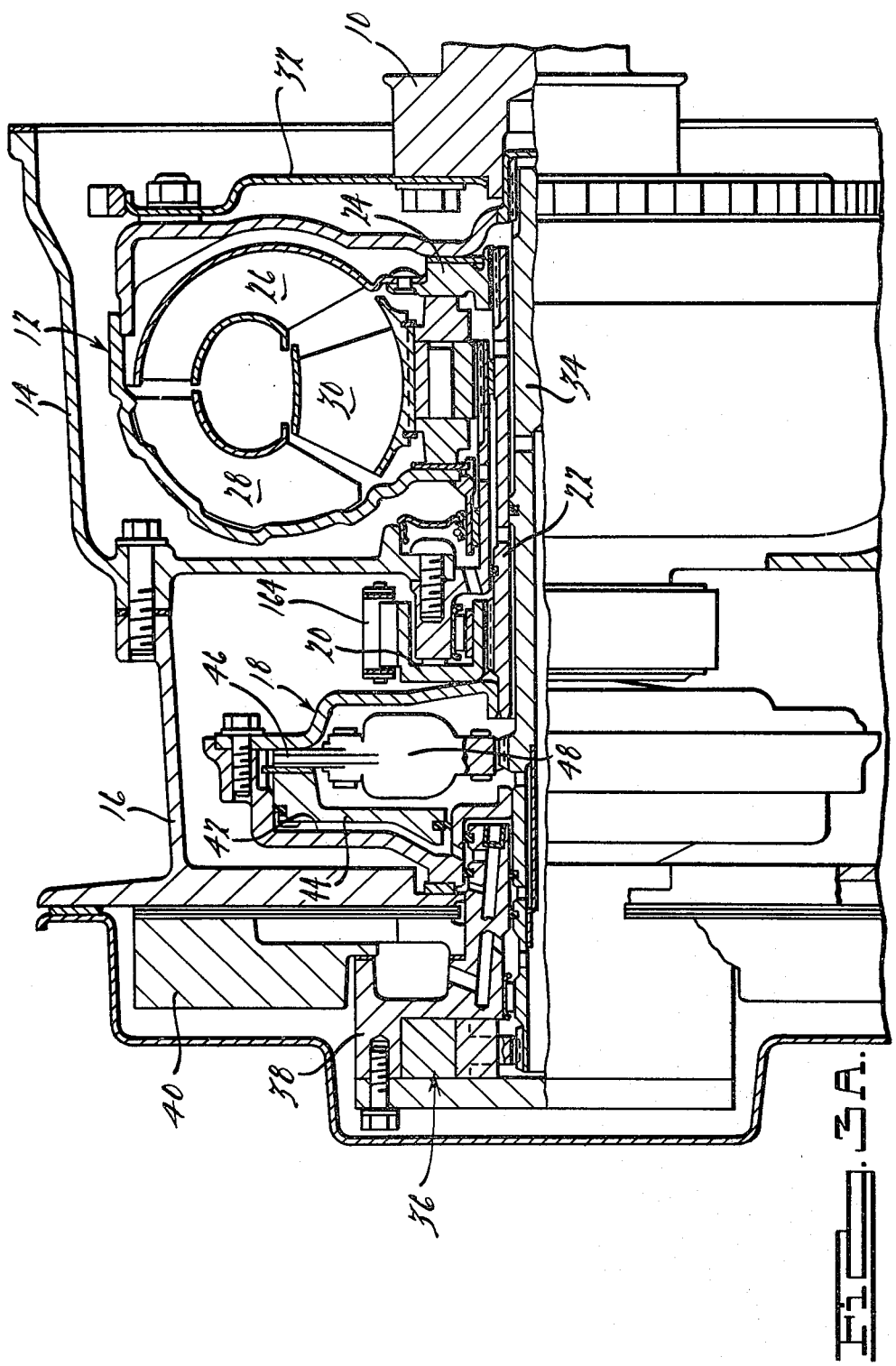

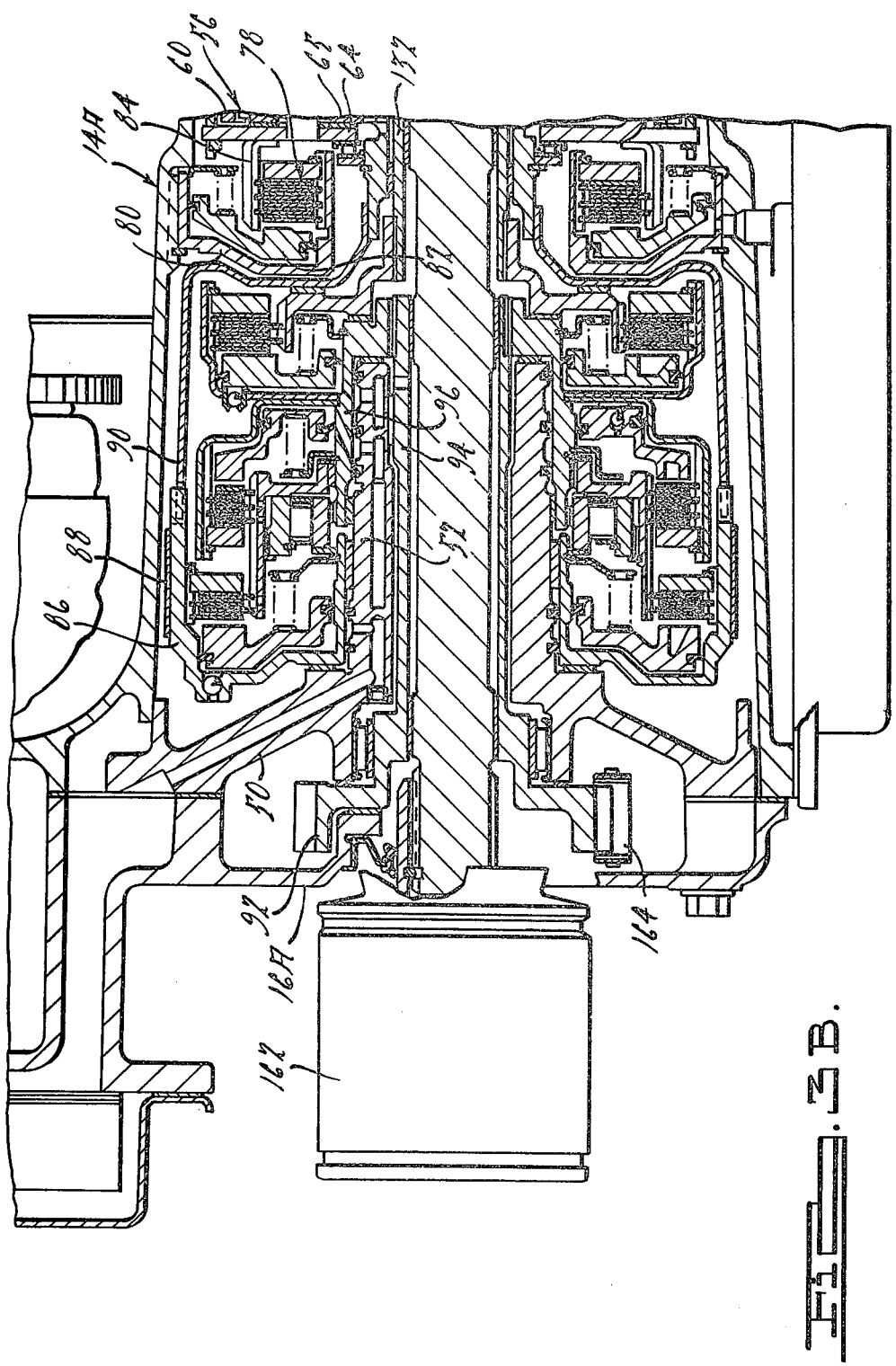

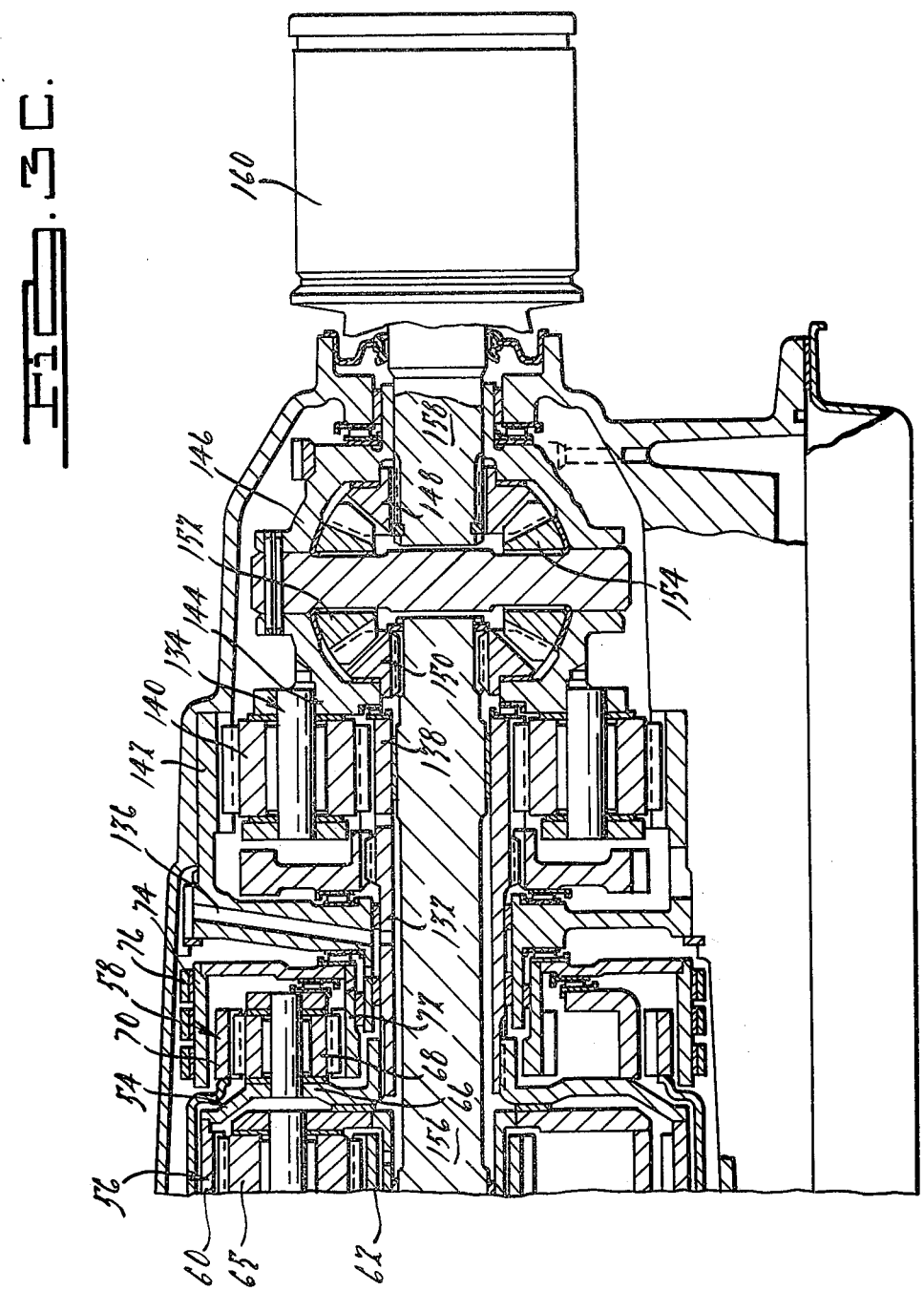

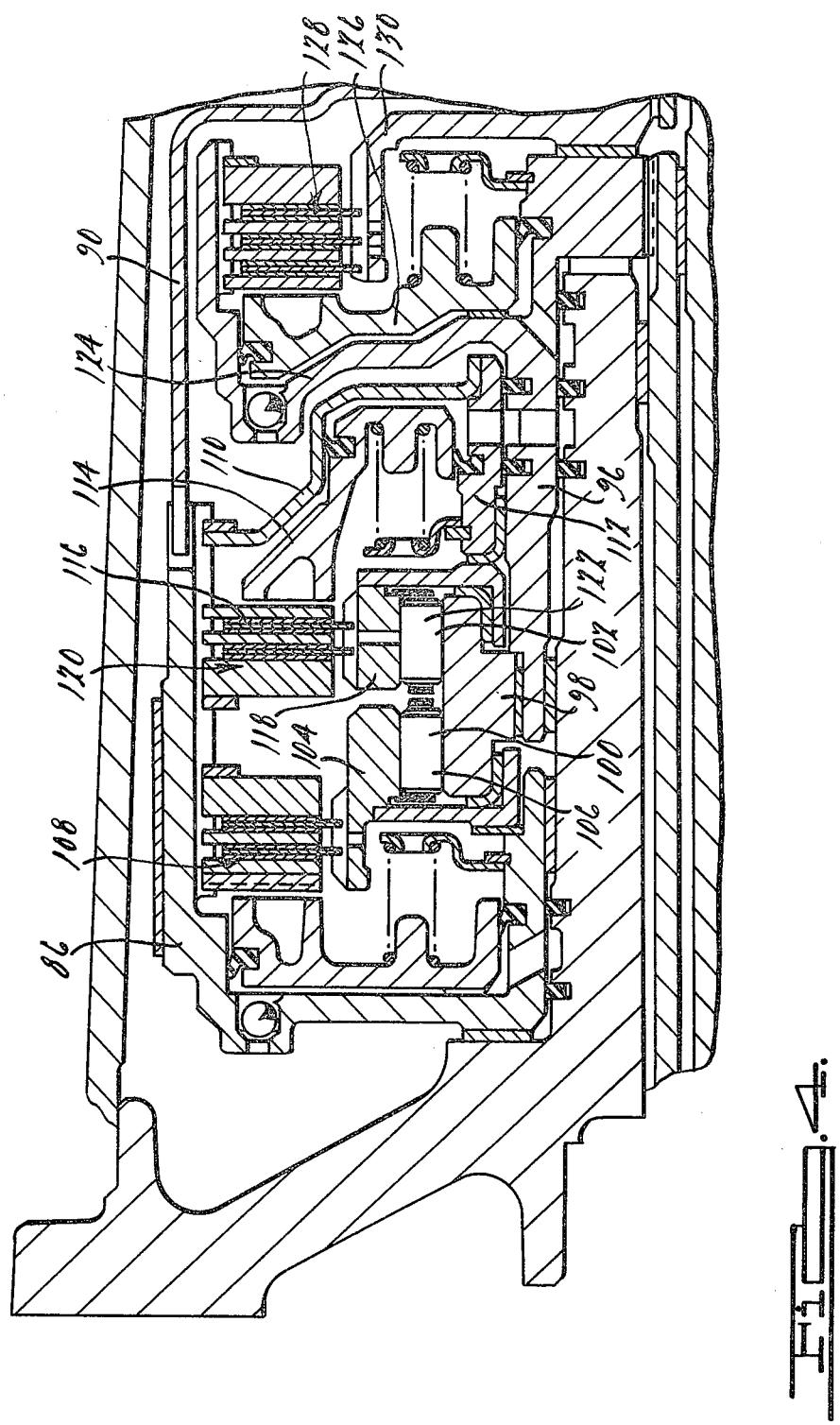

AUTOMATIC TRANSAXLE DRIVELINE HAVING FOUR FORWARD DRIVING RATIOS AND A SINGLE REVERSE RATIO

GENERAL DESCRIPTION OF THE INVENTION

This invention is an improvement in the invention disclosed in copending application of Stanley L. Pierce, entitled "Four Speed Ratio Transverse Automatic Transmission", Ser. No. 141,855, filed Apr. 21, 1980, which is assigned to the assignee of this disclosure. The gear system of that copending disclosure includes a pair of simple planetary gear units mounted on a first axis and a hydrokinetic unit mounted on a second axis that is parallel and displaced laterally from the first axis and a final drive gear assembly including a differential gear unit that connects the output element of the simple planetary gearing to each of two driving shafts for vehicle traction wheels, one driving shaft being concentrically arranged within the gearing. The gearing elements in the converter are arranged to accommodate a vehicle engine that is mounted transversely with respect to the center plane of the vehicle. The transmission is capable of providing four forward driving ratios and a single reverse ratio, the highest forward driving ratio being an overdrive.

Unlike the gearing arrangement of the copending disclosure of Stanley L. Pierce, the gearing of our invention makes it possible to achieve a ratio change from the third forward driving ratio to the fourth overdrive ratio without the necessity for establishing timed disengagement of a high speed ratio clutch and application of a friction brake. It merely is necessary in my improved arrangement to apply a single friction brake to achieve a ratio change to the highest ratio. A ratio change from the first ratio to the second forward drive ratio is achieved merely by engaging a second friction clutch while the companion friction clutch remains applied. Thus, a ratio change from the first ratio and from the third ratio in the forward driving speed range is achieved merely by engaging or disengaging a single friction element, either a clutch or a brake, thereby simplifying greatly the control of the clutches and smoothing the ratio changes during acceleration of the vehicle from a standing start.

BRIEF DESCRIPTION OF THE FIGURES OF THE DRAWINGS

FIG. 1 is a chart showing the clutch-and-brake engagement and release pattern for the friction elements that control the ratio changes in the transmission illustrated schematically in FIG. 2.

FIG. 2 shows in schematic form the torque delivery elements of my improved automatic transmission.

FIGS. 3A, 3B and 3C show a cross-sectional view of a working embodiment of the transmission structure illustrated schematically in FIG. 2.

FIG. 4 is an enlargement of a portion of the cross-sectional view of FIG. 3B showing the clutches and brakes for the transmission.

PARTICULAR DESCRIPTION OF THE INVENTION

In FIG. 3A reference numeral 10 designates one end of a crankshaft for an internal combustion vehicle engine. Numeral 12 designates generally a hydrokinetic torque converter located within a transmission housing 14 adapted to be bolted to the cylinder block of the internal combustion engine. Transmission housing 16 is secured by bolts to the left side of the housing portion 14 and it encloses a lockup clutch 18 and a drive sprocket 20, the latter being driven by turbine shaft 22. The hub 24 of bladed turbine 26 is splined to the right end of the sleeve shaft 22.

The hydrokinetic unit 12 includes, in addition to the turbine 26, a bladed impeller 28 and a bladed stator 30 arranged in fluid flow relationship. Impeller 28 is connected drivably to the crankshaft 10 through a driveplate 32. Turbine is drivably connected to the right hand end of shaft 34 which extends through the coupling of lockup clutch 18. A positive displacement pump 36 connected to the shaft 34 is situated in pump housing 38, the latter being bolted to valve housing 40 which encloses the control valve elements for the clutch and brake servos of the transmission.

The clutch 18 includes a clutch cylinder 42 in which is situated clutch piston 44. Friction disc 46 of the clutch 18 is connected to the shaft 34 through a spring damper assembly generally shown in schematic form at 48. When the clutch 18 is engaged as pressure is introduced to the cylinder 42, the turbine 26 becomes connected drivably to the impeller 28.

The lower portion of the transmission housing is designated in FIG. 3B by reference character 14A. The left hand side of the housing 14A is closed by housing portion 16A which forms a part of the housing 16. An end wall 50 is situated at the left hand end of the housing portion 16A and forms a clutch-and-brake stationary support sleeve shaft 52.

The housing portion 14A includes a planetary gear system 54 which has a first planetary gear unit 56 and a second planetary gear unit 58. Gear unit 56 includes ring gear 60, sun gear 62, carrier 64, and planet pinions 65 journalled rotatably on the carrier 64. Ring gear 60 is connected directly to carrier 66 of the planetary gear unit 58. Pinions 68 are journalled rotatably on the carrier 66 and engage ring gear 70 and sun gear 72 of the gear unit 58.

A brake drum 74 is formed on the sun gear 72. It is surrounded by a brake band 76 which is applied during operation in the first and second forward driving speed ratio to anchor the sun gear 72.

Carrier 64 is adapted to be braked by friction brake 78 during operation in reverse. Brake 78 comprises a brake cylinder 80 which encloses a brake piston 82. When cylinder 80 is pressurized, brake 78 causes frictional engagement of brake discs connected to the brake cylinder 80 and to brake element 84.

Clutch-and-brake drum 86 is journalled on the stationary sleeve shaft 52. It is surrounded by brake band 88 which, when applied, anchors the sun gear 62 to establish an overdrive fourth ratio. Brake drum 86 is connected drivably to the sun gear 62 through torque transfer member 90.

Drive sprocket 92 is connected through sleeve shaft 94 to clutch member 96. This member is splined to overrunning clutch inner race 98 for twin overrunning clutches 100 and 102. A clutch outer race 104 surrounds the inner race 98 and clutch rollers 106 are disposed between the races to provide a one way torque transfer from the race 98 to the race 104 during torque delivery, the race 104 being cammed so that the rollers 106 register with the cam surfaces. The outer race 104 is adapted to be clutched by friction clutch 108 to the clutch-andbrake drum 86 during operation in the first, the second and the third forward driving ratios.

Clutch cylinder 110 is connected at its periphery to drum 86 and is journalled at its hub 112 on the clutch element 96. The cylinder 110 receives therein clutch piston 114 which is adapted to engage frictionally the clutch discs 116, alternate ones of which are carried by the drum 86. The companion discs of the clutch assembly are splined to outer clutch race 118. The clutch discs engaged by the piston 114 form a part of a clutch assembly designated generally by reference character 120.

Overrunning coupling rollers 122 are situated between the races 98 and 118 and are adapted to accommodate transfer of torque from the race 118 to the race 98, although freewheeling in the opposite direction is permitted. The overrunning clutch of which roller 122 forms a part transfers torque in a direction opposite to the direction of torque transfer by the rollers 106.

Clutch element 96 forms a part of clutch cylinder 124 in which is positioned clutch piston 126. Clutch discs of multiple disc clutch assembly 128 are carried by the cylinder 124 and by clutch element 130, the latter being splined to sleeve shaft 132 connected to the carrier 64.

Carrier 66 of the planetary gear unit 58 is connected to sun gear shaft 132 of the final drive assembly 134. Shaft 132 is journalled in end wall 136 formed in the housing portion 14A. Sun gear 138 is connected to the shaft 132 and engages pinions 140 which in turn engage fixed ring gear 142. Pinions 140 are journalled on a carrier 144 which is connected directly to differential pinion carrier 146. Differential side gears 148 and 150 are located in the differential carrier housing 146 and they mesh with beveled pinions 152 and 154 supported on pinion shafts that extend across the interior of the housing 146. Side gear 150 is connected to output shaft 156 and side gear 148 is connected to output shaft 158. The outboard end of shaft 158 is connected by constant velocity universal joint 160 to one axle half shaft and the outboard end of shaft 156 is connected by universal joint 162 to the opposite axle half shaft for the vehicle.

The drive sprocket 20 is connected to sprocket 92 through a drive chain 164.

FIG. 2 shows the torque delivery elements in schematic form and FIG. 2 shows the clutch-and-brake engagement and release pattern for effecting the various ratio changes. The clutches 108, 120 and 128 are designated in FIGS. 1 and 2 by reference symbols $C_1$, $C_3$ and $C_2$, respectively. The brakes 88, 78 and 76 are designated in FIGS. 1 and 2 by the symbols $B_1$, $B_2$ and $B_3$, respectively.

The first forward driving speed ratio is obtained by engaging clutch $C_1$. Torque from the sprocket 92 then is delivered through the coupling 106 and through the clutch 108 to the sun gear 62. Brake $B_3$ is applied so that sun gear acts as a reaction point. If coast braking during operation in the lowest ratio is desired, clutch $C_3$ can be applied.

A ratio change to the second underdrive speed ratio is obtained merely by engaging clutches $C_2$, which causes coupling 106 to overrun. Clutch $C_1$ may remain applied but is inactive. Driving torque from the sprocket 92 then drives the carrier 64 with the sun gear 72 acting as a reaction point. The carrier 66 and the output shaft 132 are driven at an increased speed ratio.

A ratio change to the third speed ratio is achieved by engaging simultaneously clutches $C_2$ and $C_3$. $C_1$ also remains applied. Overrunning clutch 122 prevents sun gear 62 from overrunning the carrier as the clutch $C_2$ delivers torque to the carrier 64.

A ratio change to the fourth speed ratio is achieved by engaging brake $B_1$. Prior to the time brake $B_1$ is engaged, clutch $C_1$ is released so that the ratio change occurs in a nonsynchronous fashion merely by application of brake $B_1$.

Reverse drive is obtained by engaging clutch $C_1$ so that torque is delivered from the sprocket 92 to the sun gears 62. The brake $B_2$ is applied so that the carrier 64 acts as a reaction point. Clutch $C_2$ is released and clutch $C_3$ remains applied to provide coast braking.

Having described a preferred form of our invention, what we claim and desire to secure by U.S. Letters Patent is:

1. A power transmission mechanism comprising a hydrokinetic unit having an impeller and a turbine, the impeller being connected to a driving shaft;

a torque transfer means comprising a driving element connected to said turbine and a driven element mounted for rotation about an axis that is laterally displaced from the axis of said hydrokinetic unit;

a multiple ratio gear system comprising two simple planetary gear units, each gear unit having a sun gear, a ring gear, a carrier and planet pinions journalled on said carrier in meshing engagement with said sun and ring gear;

first clutch means for connecting said driven element to the sun gear of a first of said gear units, second clutch means for connecting the carrier of said first gear unit to said driven element, third clutch means for connecting the sun gear of said first gear unit to said driven element;

first brake means for braking the sun gear of said first gear unit, second brake means for braking the carrier of said first gear unit and third brake means for braking the sun gear of the second of said gear units;

the carrier of said first gear unit being connected to the ring gear of said second gear unit, the ring gear of said first gear unit and the carrier of said second gear unit being connected to a driven member;

said first clutch means comprising a first overrunning coupling and a first friction clutch in series relationship, said first overrunning coupling being effective to transfer driving torque from said driven element to said gear system;

said third clutch means comprising a second overrunning coupling and another friction clutch in series relationship, said second overrunning coupling being adapted to deliver the sun gear torque of the sun gear of said first gear unit to the torque input side of said first overrunning coupling;

said driven member comprising a part of final drive gearing;

said final drive gearing having a differential gear assembly with differential side gears, a differential carrier and pinions on said differential carrier engaging said side gears, a torque output shaft connected to said side gear, one torque output shaft extending concentrically through said planetary gear system.

2. The combination as set forth in claim 1 wherein said torque transfer means includes a drive sprocket connected to said turbine and said driven element is a driven sprocket, said sprockets being drivably connected through a drive chain.

\* \* \* \* \*